Patented Apr. 26, 1949

2,468,711

UNITED STATES PATENT OFFICE 2,468,711

VITREOUS ENAMEL OPACIFICATION

Burnham W. King, Jr., Shaker Heights, and Lofton C. Baumhardt, Elyria, Ohio, assignors to The Harshaw Chemical Company, Elyria, Ohio, a corporation of Ohio No Drawing. Application October 4, 1946, Serial No. 701,080

4 Claims. (Cl. 106—48)

This invention relates to mill addition opacifiers for vitreous enamels and more especially for use with zirconium type frits.

Vitreous enamels such as are used for enameling on sheet steel usually are prepared by milling together more or less opaque frits, suspending agents, electrolytes and a mill addition opacifier, spraying the resulting slip on the surface of the metal, drying and firing. Opaque frits in most common use today are those which contain relatively high percentages of antimony compounds, known as antimony type frits, and those which contain relatively large amounts of zirconium compounds, known as zirconium type frits. The zirconium type frits being of greatest interest as respects the present invention, may be exemplified by the following composition ranges, it being understood that these are merely optimum compositions and that many zirconium type frits may be found in commercial use which are outside the ranges indicated. The sample composition ranges referred to are as follows: $ZrO_2$ 11–15 parts by weight, $SiO_2$ 25–50 parts by weight, $B_2O_3$ 7–14 parts by weight, $Na_2O + K_2O$ 12–17 parts by weight, $Al_2O_3$ 7–10 parts by weight, ZnO 1–20 parts by weight, and CaO 1–6 parts by weight, $F_2$ 5–15 parts by weight.

We have now discovered a series of novel compositions which are useful as mill addition opacifiers, especially for imparting opacity to zirconium type frits. These are the calcination products of suitable basic materials with mixtures of antimony and aluminum oxides or materials capable of yielding them upon calcination. Also included among these compositions are the calcination products of suitable basic materials with mixtures of the oxides of antimony, titanium and aluminum.

The above indicated compositions are approximately equal in opaquing value to the best commercial opacifiers now being used for zirconium type frits and, since they contain no $TiO_2$ or less $TiO_2$, they represent a substantial saving in cost of manufacture.

The molecular formula expressing our preferred proportions of the constituent oxides in calcination products according to our invention is as follows:

$$vMO \cdot wMF_2 \cdot xSb_2O_5 \cdot yAl_2O_3 zTiO_2$$

wherein $v+w$ is equal to from 1.5 to 0.2 times the sum of $x+y+z$, $y+z$ is equal to from $0.2x$ to $3x$, $z$ is equal to from zero to $2y$ and $w$ is equal to from zero to $2v$. Proportions are molecular. In the above formula M may be a suitable basic metal such as Ca, Mg, Ba, Sr, Zn or mixtures in any proportions, preferably Ca. At present we consider the optimum composition of the calcination product, theoretical melted basis, to be as follows:

$$5CaO \cdot CaF_2 \cdot 4Sb_2O_5 \cdot 3Al_2O_3$$

Variations of plus or minus 20 mol per cent in the quantity of any of the above constituent compounds give very excellent compositions and $TiO_2$ can be substituted mol for mol for up to two thirds of the $Al_2O_3$. Magnesium may be substituted for part or all the calcium. These compositions may be employed as mill addition opacifiers with zirconium type frits, being used at the rate of from ½% to 4% based upon the weight of the frit.

In accordance with our invention, the constituent oxides and fluorides, or materials capable of yielding the same upon firing, are mixed together and heated at temperatures of the order of 900° C. to 1250° C., preferably 1000° C. to 1150° C. The heating time will vary according to the size of the batch, but ordinarily the firing cycle will contemplate elevating the temperature of the batch to the indicated firing range in a period of from 2 to 24 hours, larger batches requiring longer time, and holding the temperature in such range for a further period of from 0 to 6 hours. The kiln atmosphere preferably will be strongly oxidizing and in any event must be sufficiently oxidizing to oxidize the $Sb_2O_3$. Preferred sources of the basic materials are the hydroxides and carbonates such as calcium hydroxide, calcium carbonate, magnesium hydroxide, magnesium carbonate, dolomite, etc. The preferred source of fluoride is fluorspar. The preferred source of $Sb_2O_5$ is commercial $Sb_2O_3$. Commercial aluminum oxide or aluminum hydrate is the preferred source of $Al_2O_3$. $TiO_2$, if used, is most available in the form of pigment grade titania. Obviously other sources of the indicated oxides may be employed if they are thermally decomposable at or below the calcination temperature to yield the indicated constituent oxides or if they can be oxidized during the calcination to yield the desired constituent oxide. The fluoride is expressed in the formulae on a theoretical melted basis, the assumption being that the fluoride remains without loss of fluorine in the final product. Actually, it is likely that some of the fluorine is lost, being replaced by oxygen to form the oxide of the base metal such as calcium.

The calcination products resulting from the above indicated preparation procedure are mixed at the mill with zirconium type frits and other usual ingredients of the mill batch, ground, sprayed on the metal to be coated, dried and fired. The resulting enamels have substantially the same characteristics in respect to opacity, color and surface quality as the best commercial enamels made from zirconium type frits and present commercial mill addition opacifiers and we are thus able to reduce the cost of manufacture by elimination of part or all the titania heretofore used in similar mill addition opacifiers, using in place thereof the relatively cheap alumina, without substantially affecting the quality of the final resulting enamel.

The following table will illustrate, by way of specific examples, satisfactory compositions in accordance with the invention:

BATCH COMPOSITION
[Parts by weight]

| Example No. | 1 | 2 | 3 | 4 | 5 | 6 |
|---|---|---|---|---|---|---|
| $CaCO_3$ | 600 | 600 | 500 | | | |
| $Ca(OH)_2$ | 74 | 74 | 0 | | | |
| $CaF_2$ | 78 | 78 | 26 | | | 78 |
| $Sb_2O_3$ | 1,155 | 1,155 | 1,155 | 1,155 | 1,155 | 1,155 |
| $Al_2O_3.3H_2O$ | 468 | 156 | 724 | 468 | 312 | 468 |
| $TiO_2$ | | 160 | | | 80 | |
| $NgCO_3$ | | | | 588 | 588 | |
| $MgF_2$ | | | | 62 | 62 | |
| $BaCO_3$ | | | | | | 1,379 |

THEORETICAL MELTED COMPOSITIONS
[Parts by weight]

| Example No. | 1 | 2 | 3 | 4 | 5 | 6 |
|---|---|---|---|---|---|---|
| $CaO$ | 392 | 392 | 280 | | | |
| $CaF_2$ | 78 | 78 | 26 | | | 78 |
| $Sb_2O_5$ | 1,294 | 1,294 | 1,294 | 1,294 | 1,294 | 1,294 |
| $Al_2O_3$ | 306 | 102 | 408 | 306 | 204 | 306 |
| $TiO_2$ | | 160 | | | 80 | |
| $MgCO_3$ | | | | 280 | 280 | |
| $MgF_2$ | | | | 62 | 62 | |
| $BaCO_3$ | | | | | | 1,071 |

Having thus described our invention, what we claim is:

1. A mill addition opacifier for vitreous enamels, the same being a calcination product and having a composition of proportions as follows: 4 to 6 mols CaO, 0.8 to 1.2 mols $CaF_2$, 3.2 to 4.8 mols $Sb_2O_5$ and 2.4 to 3.6 mols $Al_2O_3$.

2. A mill addition opacifier for vitreous enamels, the same being a calcination product and having a composition of proportions as follows: 4 to 6 mols CaO, 0.8 to 1.2 mols $CaF_2$, 3.2 to 4.8 mols $Sb_2O_5$, and the remainder consisting of $Al_2O_3$ and $TiO_2$, the combined number of mols of $Al_2O_3$ and $TiO_2$ being from 2.4 to 3.6 and the number of mols of $Al_2O_3$ being from 1.6 to approximately 3.6.

3. A vitreous enamel composition principally composed of (1) a zirconium frit comprising, $ZrO_2$ 11 to 15 parts by weight, $SiO_2$ 25 to 50 parts by weight, $B_2O_3$ 7 to 14 parts by weight, $Na_2O$ plus $K_2O$ 12 to 17 parts by weight, $Al_2O_3$ 7 to 10 parts by weight, ZnO 1 to 20 parts by weight, CaO 1 to 6 parts by weight and $F_2$ 5 to 15 parts by weight and (2) from ½% to 4% based upon the weight of the frit of a mill addition opacifier, the latter being a calcination product and having a composition of proportions as follows: 4 to 6 mols CaO, 0.8 to 1.2 mols $CaF_2$, 3.2 to 4.8 mols $Sb_2O_5$ and 2.4 to 3.6 mols $Al_2O_3$.

4. A vitreous enamel composition principally composed of (1) a zirconium frit comprising, $ZrO_2$ 11 to 15 parts by weight, $SiO_2$ 25 to 50 parts by weight, $B_2O_3$ 7 to 14 parts by weight, $Na_2O$ plus $K_2O$ 12 to 17 parts by weight, $Al_2O_3$ 7 to 10 parts by weight, ZnO 1 to 20 parts by weight, CaO 1 to 6 parts by weight and $F_2$ 5 to 15 parts by weight and (2) from ½% to 4% based upon the weight of the frit of a mill addition opacifier, the latter being a calcination product and having a composition of proportions as follows: 4 to 6 mols CaO, 0.8 to 1.2 mols $CaF_2$, 3.2 to 4.8 mols $Sb_2O_5$, and the remainder consisting of $Al_2O_3$ and $TiO_2$, the combined number of mols of $Al_2O_3$ and $TiO_2$ being from 2.4 to 3.6 and the number of mols of $Al_2O_3$ being from 1.6 to approximately 3.6.

BURNHAM W. KING, Jr.
LOFTON C. BAUMHARDT.

REFERENCES CITED

The following references are of record in the file of this patent:

UNITED STATES PATENTS

| Number | Name | Date |
|---|---|---|
| 2,199,794 | Harshaw et al. | May 7, 1940 |
| 2,200,170 | Harshaw et al. | May 7, 1940 |